(12) United States Patent
Satzger et al.

(10) Patent No.: US 9,625,188 B2
(45) Date of Patent: Apr. 18, 2017

(54) METHOD FOR OPERATING A REFRIGERANT CIRCUIT AS A HEAT PUMP AND HEAT PUMP OPERABLE AS A REFRIGERANT CIRCUIT

(71) Applicant: Bayerische Motoren Werke Aktiengesellschaft, Munich (DE)

(72) Inventors: Peter Satzger, Landsberg am Lech (DE); Oliver Horn, Munich (DE); Robert Herbolzheimer, Groebenzell (DE); Martin Knott, Dachau (DE); Stefan Morgenstern, Munich (DE); Felix Schedel, Gauting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 105 days.

(21) Appl. No.: 14/734,535

(22) Filed: Jun. 9, 2015

(65) Prior Publication Data

US 2015/0276281 A1    Oct. 1, 2015

Related U.S. Application Data

(63) Continuation of application No. PCT/EP2013/073201, filed on Nov. 7, 2013.

(30) Foreign Application Priority Data

Dec. 10, 2012  (DE) .................. 10 2012 222 594

(51) Int. Cl.
*F25B 30/02*   (2006.01)
*B60H 1/00*    (2006.01)

(52) U.S. Cl.
CPC ......... *F25B 30/02* (2013.01); *B60H 1/00914* (2013.01); *B60H 2001/00928* (2013.01)

(58) Field of Classification Search
CPC ............... F25B 30/02; B60H 1/00914; B60H 2001/00928
See application file for complete search history.

(56) References Cited

U.S. PATENT DOCUMENTS

| 4,163,369 A | * | 8/1979 | Owen | ..................... F25B 30/02 237/2 B |
| 4,474,018 A | * | 10/1984 | Teagan | ................... F24D 17/02 237/2 B |

(Continued)

FOREIGN PATENT DOCUMENTS

| CN | 101001765 A | 7/2007 |
| CN | 101324382 A | 12/2008 |

(Continued)

OTHER PUBLICATIONS

International Search Report (PCT/ISA/210) dated Jan. 29, 2014, with English translation (four (4) pages).

(Continued)

*Primary Examiner* — Emmanuel Duke
(74) *Attorney, Agent, or Firm* — Crowell & Moring LLP

(57) ABSTRACT

A method of operating a refrigerant circuit as a heat pump is provided. By way of a compressor, refrigerant is compressed and is pumped through a refrigerant/heating heat exchanger. The refrigerant coming from the refrigerant/heating heat exchanger is expanded in at least a first expansion element. The refrigerant expanded by way of the first expansion element flows to a suction input of the compressor through at least one evaporator. At a branch-off point of the refrigerant/heating heat exchanger situated between a refrigerant input and a refrigerant output of the refrigerant/heating heat exchanger, refrigerant is branched off and is guided by way of a second expansion element in the direction of the suction input of the refrigerant compressor.

23 Claims, 5 Drawing Sheets

(56) References Cited

U.S. PATENT DOCUMENTS

| | | | |
|---|---|---|---|
| 6,536,221 B2* | 3/2003 | James | F25B 40/04 62/183 |
| 2001/0048031 A1* | 12/2001 | Noro | F24H 4/04 237/2 B |
| 2002/0066278 A1* | 6/2002 | Cho | F25B 6/04 62/114 |
| 2003/0177778 A1 | 9/2003 | Hesse | |
| 2005/0205682 A1 | 9/2005 | Sanger et al. | |
| 2009/0049848 A1 | 2/2009 | Markowitz et al. | |
| 2012/0204596 A1* | 8/2012 | Takenaka | F25B 6/04 62/510 |

FOREIGN PATENT DOCUMENTS

| | | |
|---|---|---|
| CN | 101353006 A | 1/2009 |
| DE | 102 07 128 A1 | 8/2003 |
| DE | 10 2011 015 151 A1 | 5/2012 |
| FR | 2 969 042 A1 | 6/2012 |
| FR | 2969042 A1 * | 6/2012 ......... B60H 1/00392 |
| JP | 10-297270 A | 11/1998 |
| JP | 10297270 A * | 11/1998 |
| JP | 2004-182204 A | 7/2004 |
| JP | 2004182204 A * | 7/2004 |
| JP | 2011208841 A * | 10/2011 |

OTHER PUBLICATIONS

German Search Report dated Oct. 21, 2013, with partial English translation (twelve (12) pages).

Chinese-language Office Action issued in counterpart Chinese Application No. 201380050178.0 dated Mar. 10, 2016 with English translation (Nineteen (19) pages).

Chinese-Language Office Action issued in counterpart Chinese Application No. 201380050178.0 dated Nov. 1, 2016 with English translation (6 pages).

* cited by examiner

METHOD FOR OPERATING A REFRIGERANT CIRCUIT AS A HEAT PUMP AND HEAT PUMP OPERABLE AS A REFRIGERANT CIRCUIT

CROSS REFERENCE TO RELATED APPLICATIONS

This application is a continuation of PCT International Application No. PCT/EP2013/073201, filed Nov. 7, 2013, which claims priority under 35 U.S.C. §119 from German Patent Application No. 10 2012 222 594.3, filed Dec. 10, 2012, the entire disclosures of which are herein expressly incorporated by reference.

BACKGROUND AND SUMMARY OF THE INVENTION

The present invention relates to a method of operating a refrigerant circuit as a heat pump as well as to a refrigerant circuit operable as a heat pump.

In the case of electric and hybrid vehicles, refrigerant circuits operable as heat pumps are increasingly considered for the temperature control of the passenger compartment and/or of individual vehicle components. At low outside temperatures (for example, temperatures below 0° C.), heat pump circuits with the component sizes customary in the case of conventional air-conditioning systems, i.e. the customary evaporator or condenser sizes, provide only a comparatively low heating power, which is less than the requirement of current vehicles. Heat pump concepts for motor vehicles known so far, as a rule, therefore have additional electric heating devices which allow an electric "auxiliary heating" at low outside temperatures.

It is an object of the invention to provide a method of operating a refrigerant circuit which allows a sufficiently high heating performance even at low outside temperatures, as well as providing a correspondingly suited refrigerant circuit.

This and other objects are achieved by a method of operating a refrigerant circuit as a heat pump, as well as a corresponding refrigerant circuit, wherein: refrigerant is compressed via a compressor and is pumped through a refrigerant/heating heat exchanger device; refrigerant coming from the refrigerant/heating heat exchanger device is expanded in at least a first expansion element; refrigerant expanded by way of the first expansion element flows to a suction input of the compressor through at least one evaporator; and, at a branch-off point of the refrigerant/heating heat exchanger device situated between a refrigerant input and a refrigerant output of the refrigerant/heating heat exchanger device, refrigerant is branched off and is guided by way of a second expansion element in the direction of the suction input.

One aspect of the invention is to ensure, by means of the development of the refrigerant circuit and by means of a suitable operating strategy, that the mass flow of the refrigerant taken in and compressed by the refrigerant compressor or the density of the refrigerant delivered by the refrigerant compressor is as high as possible (particularly, at low outside temperatures).

In principle, it could be considered to control the refrigerant volume flow by way of a rotational speed adaptation of the refrigerant compressor. However, the mass flow of the refrigerant not only depends on the refrigerant volume flow of the compressor but also on the density of the refrigerant at the inlet of the refrigerant compressor. In addition, the refrigerant flow cannot be arbitrarily increased because otherwise the temperature at the one or more evaporators of the refrigerant circuit would decrease excessively.

Both problems can be solved by way of the present invention.

A refrigerant circuit according to the invention has a refrigerant compressor which takes in refrigerant, compresses it and pumps it through a "refrigerant/heating heat exchanger device" or additionally a condenser/gas cooler in the air conditioner. The "refrigerant/heating heat exchanger device" may, for example, be a "refrigerant/fluid heat exchanger device" by way of which the heat is transferred from the refrigerant to a fluid transferred by pumping in a heating circuit, or a "refrigerant/air heat exchanger device" by way of which heat is transferred from the refrigerant (without an interconnected heating circuit through which fluid is flowing) to the air flowing into a passenger compartment.

Refrigerant coming from the refrigerant/heating heat exchanger device is expanded in at least a first expansion element. The expanded refrigerant flows through at least one evaporator of the refrigerant circuit and flows back from there in the direction of a suction input of the compressor.

The at least one evaporator may, for example, be an ambient heat exchanger which receives heat from the ambient air. In particular, several evaporators may also be provided, for example, an evaporator which cools a vehicle component, wherein the component is a high-voltage accumulator or the like.

According to the invention, at a branch-off point of the refrigerant/heating heat exchanger device situated between a refrigerant input and a refrigerant output of the refrigerant/heating heat exchanger device, refrigerant is branched off and is guided by way of a second expansion element in the direction of the suction input. The refrigerant/heating heat exchanger device may be a refrigerant/fluid heat exchanger device which cools and possibly also condenses the refrigerant, the transmitted heat being used for heating the interior by way of a heating circuit having a heating heat transfer device in the air conditioner. As an alternative, the refrigerant/heating heat exchanger device may be a refrigerant/air heat exchanger device which cools and possibly condenses the refrigerant, this heat, for heating the interior being utilized directly in the air conditioner. Depending on the refrigerant, only a cooling of the refrigerant or additionally also a condensation takes place in the refrigerant/heating heat exchanger device.

A refrigerant mass flow, which is branched off from the branch-off point of the refrigerant/heating heat exchanger device, can therefore be admixed to the refrigerant mass flow coming from the at least one evaporator. As a result, the density of the refrigerant taken in by the refrigerant compressor or the refrigerant mass flow can be set or controlled such that a heating power is obtained that is as high as possible also at low outside temperatures.

According to a further aspect of the invention, a second expansion element is provided in the section of the refrigerant circuit which is situated between the branch-off point of the refrigerant/heating heat exchanger device and the suction input of the refrigerant compressor.

The refrigerant/heating heat exchanger device can be thought of as being subdivided into a "first section", which extends from the refrigerant input to the branch-off point. In this first section, the refrigerant, which is compressed by the refrigerant compressor and heated, is cooled, in which case it may be provided that it remains gaseous, i.e. superheated, on the entire first section. Correspondingly, the first section of the refrigerant/heating heat exchanger device could be called a "superdeheater", by way of which gaseous refrigerant is cooled.

A "second section" of the refrigerant/heating heat exchanger device is formed by the section situated between the branch-off point and the refrigerant output. On this section, the refrigerant continues to release heat and condenses depending on the refrigerant or continues to be cooled supercritically. The second section could be called a "condenser or gas cooler", in that the gaseous refrigerant coming from the first section is completely or partly condensed or is cooled supercritically.

According to a further aspect of the invention, the refrigerant circuit is thermally coupled by way of the refrigerant/heating heat exchanger device (in this context, refrigerant/fluid heat exchanger device) with a heating circuit, through which a fluid is flowing. The refrigerant/fluid heat exchanger device may be a heat exchanger device through which refrigerant and fluid flow in a counter-flow (counter-flow heat exchanger). The above-mentioned superdeheater section and the condenser- or gas cooler section may be formed by two sections of a single counter-flow heat exchanger. As an alternative, the superdeheater and the condenser or gas cooler may also be formed by two separate series-connected counter-flow heat exchangers.

The heating circuit has a refrigerant or water pump, the two sections (superdeheater section and condenser or gas cooler section) of the refrigerant/fluid heat exchanger device, and a heating heat exchanger. The heating heat exchanger, which is normally situated in the air conditioner, is a fluid/air heat exchanger by way of which heat from the fluid or the water can be released to the air flowing into a passenger compartment of a vehicle.

According to another aspect of the invention, the refrigerant/heating heat exchanger device is constructed as a refrigerant/air heat exchanger device. In this case, the refrigerant circuit releases heating heat by way of the refrigerant/air heat exchanger device, which is normally situated in the air conditioner, directly to the air flowing into a passenger compartment of a vehicle. In this case, the two parts of the refrigerant/air heat exchanger device may be connected in series on the air side, preferably the flow through the first part takes place after the flow through the second part on the air side.

According to a further aspect of the invention, following the refrigerant output of the refrigerant/heating heat exchanger device, i.e. between the refrigerant/heating heat exchanger device and the at least one first expansion element, a further branch-off point is provided, which, by way of a third expansion element, is in a fluid connection with the suction input of the refrigerant compressor.

The second and/or the third expansion elements may preferably be automatically controllable expansion elements. As an alternative, they may also be single expansion elements with a fixed flow cross-section, which can each be opened or closed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
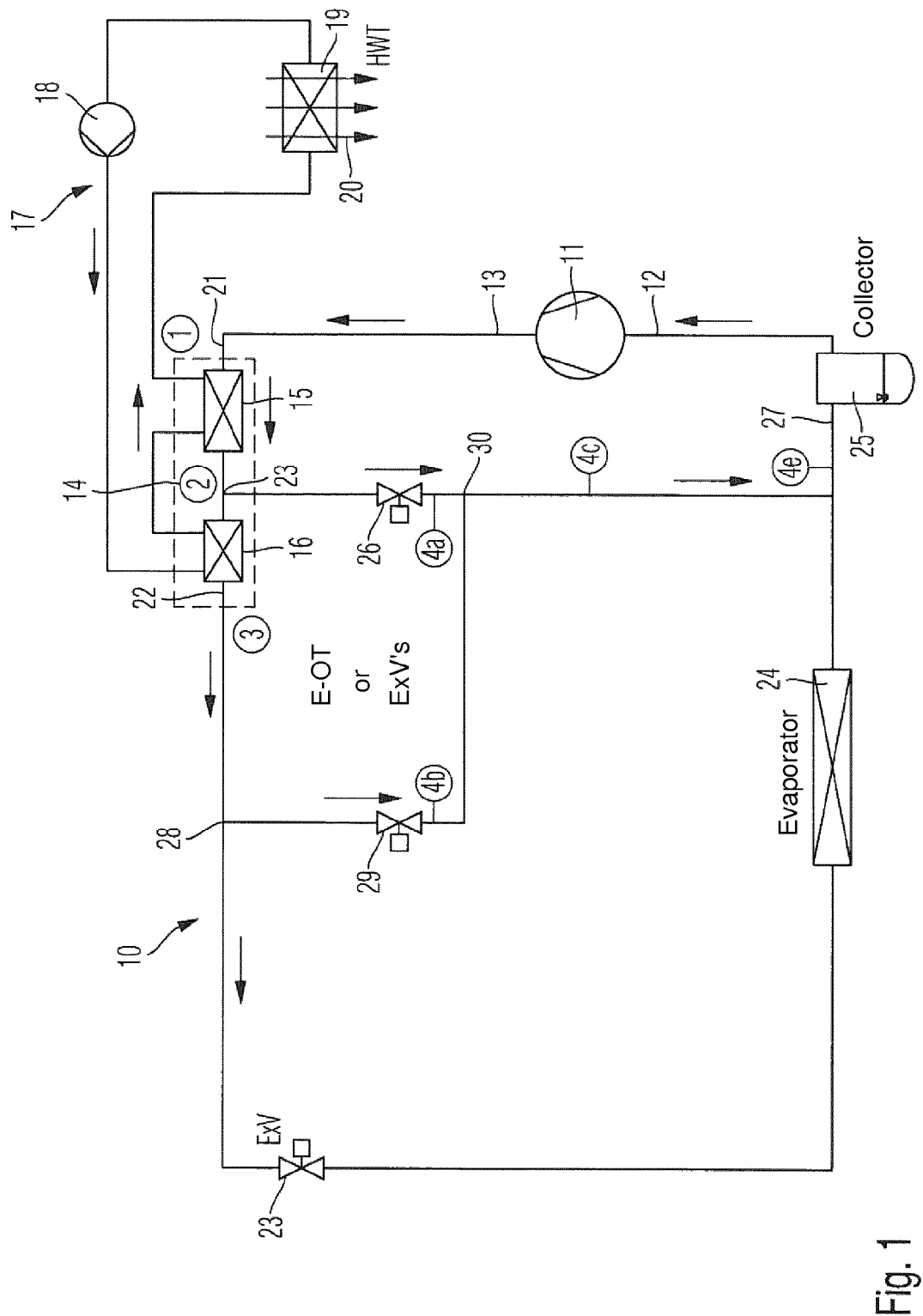
FIG. 1 is a schematic diagram of a first embodiment of a refrigerant circuit according to the invention.

FIG. 1 illustrates a refrigerant circuit 10 having a refrigerant compressor 11. The refrigerant compressor 11 takes in refrigerant by way of a suction input 12, compresses the refrigerant and pumps the compressed refrigerant by way of a pressure output 13 to a refrigerant/fluid heat exchanger device 14.

In the embodiment illustrated here, the refrigerant/fluid heat exchanger device 14 is formed by two series-connected counter-flow heat exchangers 15, 16. The refrigerant circuit 10 is thermally coupled with a heating circuit 17 by way of the refrigerant/fluid heat exchanger device 14. The heating circuit 17 has a water pump 18, which pumps heating fluid or water against the flow direction of the refrigerant first through the heat exchanger 16 and then through the heat exchanger 15 and finally through a heating heat exchanger 19. By way of the refrigerant/fluid heat exchanger device 14, heat from the refrigerant compressed by the refrigerant compressor 11 can be released to the fluid transferred by pumping in the heating circuit 17. By way of the heating heat exchanger 19, heat from the fluid transferred by pumping in the heating circuit 17 can be released into air 20 that is to be blown into a passenger compartment of a vehicle, which air flows through and/or around the heating heat exchanger 19.

The heat exchanger 15 operates as a superdeheater, the heat exchanger 16 connected in series thereto operates as a condenser or, in the case of a refrigerant in a supercritical mode of operation, as a gas cooler. Refrigerant, which was compressed by the refrigerant compressor 11 and was heated, first releases heat by way of the heat exchanger 15. In this case, the refrigerant remains in the gaseous state but cools down. In the heat exchanger 16, the refrigerant is cooled further and, depending on the refrigerant, is partially or completely compressed or supercritically cooled.

The refrigerant/fluid heat exchanger device 14 has a refrigerant input 21, a refrigerant output 22 and a branch-off point 23. Viewed in the flow direction of the refrigerant, the branch-off point 23 is situated between the refrigerant input 21 and the refrigerant output 22. In the case of the embodiment illustrated here, in which the refrigerant/fluid heat exchanger device 14 is formed by two separate heat exchangers 15, 16, the branch-off point 23 is situated between the two heat exchangers 15, 16.

As an alternative to the embodiment illustrated here, the "superdeheater section 15" and the "condenser section 16" may be combined into a single heat exchanger. In this case, the branch-off point 23 would be situated in the heat exchanger.

Refrigerant coming from the refrigerant output 22 flows to a first expansion element 23, which is constructed here as an electrically or electronically controllable or automatically controllable expansion element. The refrigerant is expanded in the expansion element 23, whereby it is cooled. Subsequently, the expanded refrigerant will flow through an evaporator or ambient heat exchanger 24. Instead of a single evaporator, several evaporators may be provided and may, for example, be connected in parallel. In the evaporator 24, the refrigerant will absorb heat, for example, from the ambient air or from a vehicle component to be cooled. After flowing through the evaporator 24, the refrigerant flows, by way of a accumulator, back to the suction input 12 of the compressor 11.

As illustrated in FIG. 1, the branch-off point 23 of the refrigerant/fluid heat exchanger device 14 is in flow communication with an input 27 of the accumulator 25 by way of a controllable or automatically controllable expansion element 26, which, in the following, will be called a second expansion element.

A branch-off point 28 provided between the output 22 and the first expansion element 23 is in a flow communication with the input 27 of the accumulator 25 by way of a third expansion element 29, which is constructed here also as a controllable or automatically controllable expansion element.

A temperature sensor and/or pressure sensor (not shown) may be provided at the accumulator input 27. An electronic system (not shown here in detail) automatically controls the controllable expansion elements 26, 29 such that no, or only a slight, overheating of the refrigerant occurs at the input 27 of the accumulator 25, whereby it is achieved that the density of the refrigerant delivered by the refrigerant compressor 11 is comparatively high, and correspondingly the refrigerant mass flow delivered by the refrigerant compressor 11 is also high. As a result, also at low outside temperatures, i.e. outside temperatures at which an only comparatively low thermal output is absorbed by way of an ambient heat exchanger or evaporator 24, a sufficiently high thermal output which is satisfactory for heating the vehicle, can be generated. In particular, a higher rotational speed of the compressor is therefor also contemplated.

Figure 2:
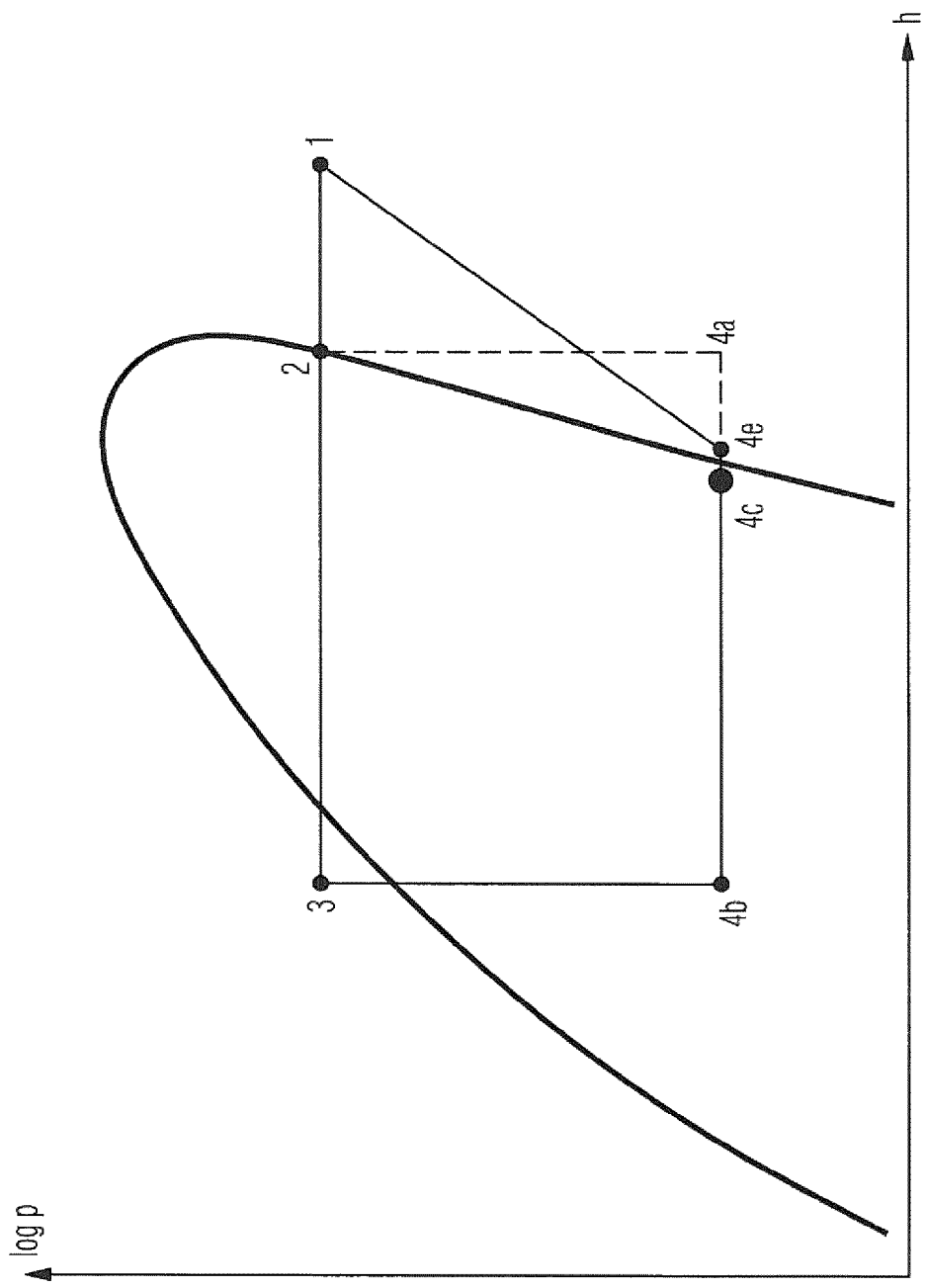
FIG. 2 is a simplified log(p)-h graphical diagram for explaining individual condition points of a refrigerant.

FIG. 2 illustrates a diagram in which the enthalpy of a refrigerant is logarithmically indicated on the abscissa and the pressure of this refrigerant, at which a condensation occurs during the heat output, is logarithmically indicated on the ordinate. References 1, 2, 3, 4a, 4b and 4c indicate different conditions of the refrigerant (compare FIG. 1). Reference number 1 represents the condition of the compressed heated refrigerant, i.e. the condition of the refrigerant at the input 21 of the refrigerant/heating heat exchanger device 14. In the superdeheater 15, the refrigerant is isobarically cooled, which corresponds to condition 2 at the branch-off point 23. In the condenser 16, the refrigerant is condensed and further isobarically cooled. The condition 3 therefore corresponds to the condition of the refrigerant at the refrigerant output 22 of the refrigerant/heating heat exchanger device 14.

The refrigerant of condition 2 is expanded by way of the second expansion element 26 to a condition 4a. The refrigerant of condition 3 is expanded by way of the third expansion element 29 to a condition 4b. Refrigerant of the two conditions 4a, 4b is mixed at the combination point 30 to form refrigerant of condition 4c. Refrigerant of condition 4c mixes with the refrigerant coming from the evaporator 24 to form condition 4e, in which it enters into the accumulator 25.

Figure 3:
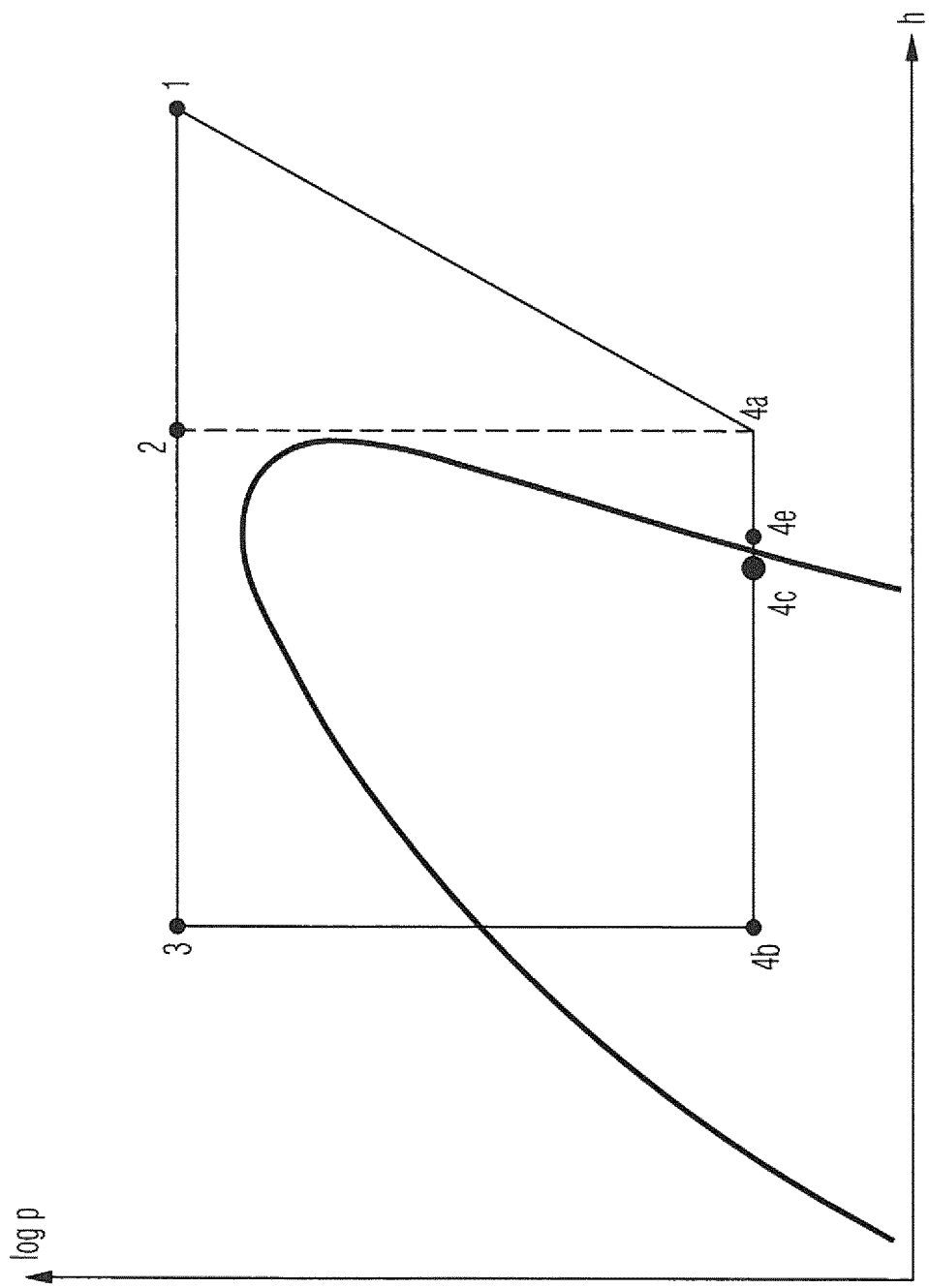
FIG. 3 is a simplified log(p)-h graphical diagram for explaining individual condition points of a refrigerant with a supercritical operating mode.

FIG. 3 illustrates the condition points for the case that the refrigerant requires a supercritical cooling, which may occur, for example, in the case of carbon dioxide refrigerant. In contrast to FIG. 2, the refrigerant is cooled in the first part of the refrigerant/heating heat exchanger device so far to Point 2 that, in the case of an expansion to Point 4a, there will either be sufficient overheating or Point 4a is at least on the right of point 4c. The further cooling to Point 3 takes place in the second part of the refrigerant/heating heat exchanger device on a supercritical isobar.

As mentioned above, the expansion elements 26, 29 are controlled such that a sufficiently high thermal output is also obtained at low ambient temperatures, with an overall efficiency that is as high as possible.

A first automatic control strategy, by opening the valve 26, permits so much refrigerant to pass through that the refrigerant compressor can compress at a rotational speed that is as high as possible and therefore also with a high output.

In the case of a second automatic control strategy, by opening the valve 29, refrigerant of condition 4b is admixed such that the refrigerant taken in by the refrigerant compressor has a condition 4e with a density that is as high as possible. By means of both strategies, a maximum thermal output is therefore generated while the maximal output of the individual evaporators is defined.

Figure 4:
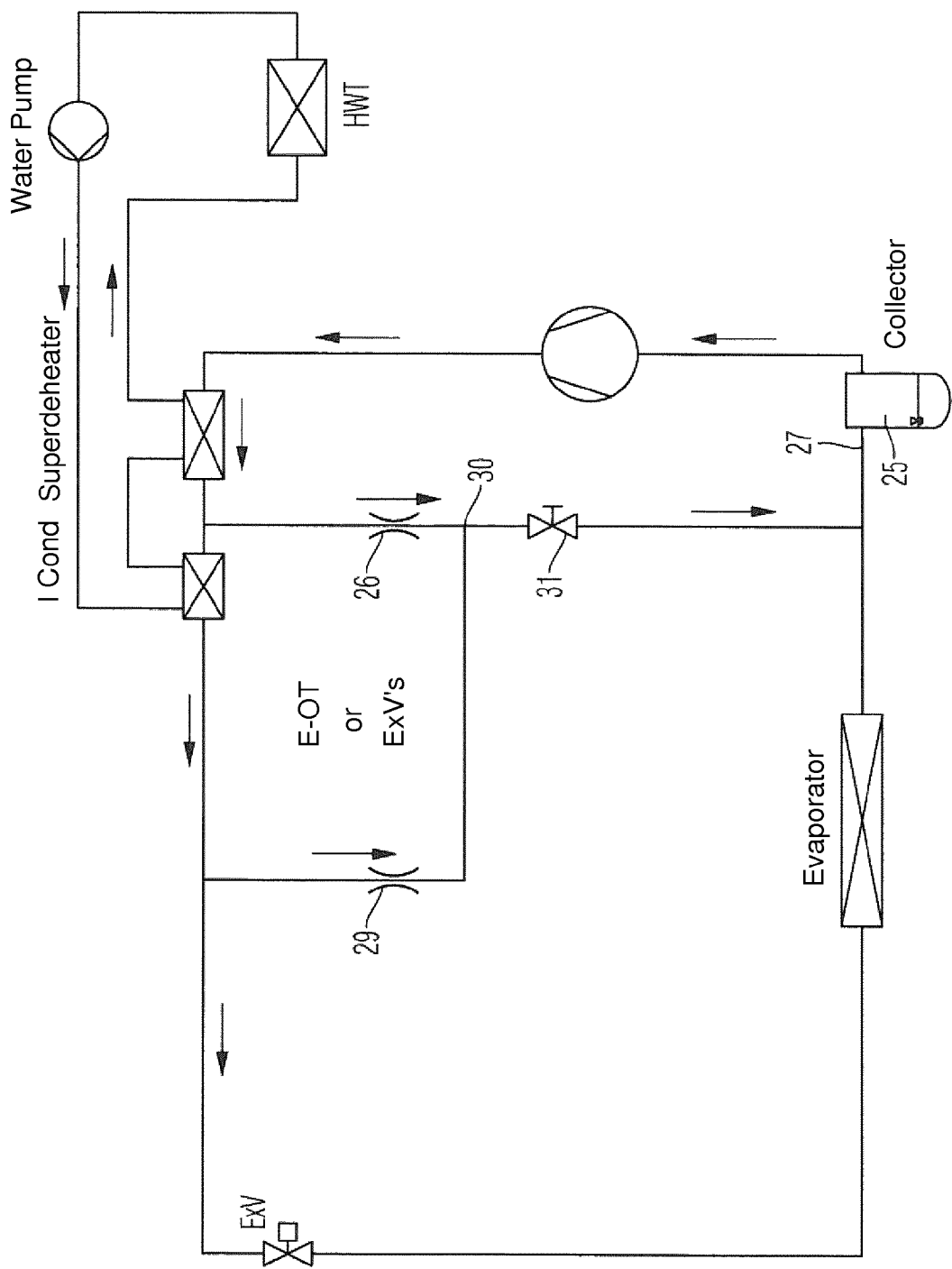
FIG. 4 is a schematic diagram of another embodiment of a refrigerant circuit according to the invention.

FIG. 4 illustrates an embodiment, in which, instead of automatically controllable expansion elements 26, 29, throttles that cannot be automatically controlled, or one orifice valve, respectively, are provided. In addition, a shut-off valve 31 is arranged between the combination point 30 and the input 27 of the accumulator 25. Otherwise, the arrangement of FIG. 3 corresponds to that of FIG. 1.

Figure 5:
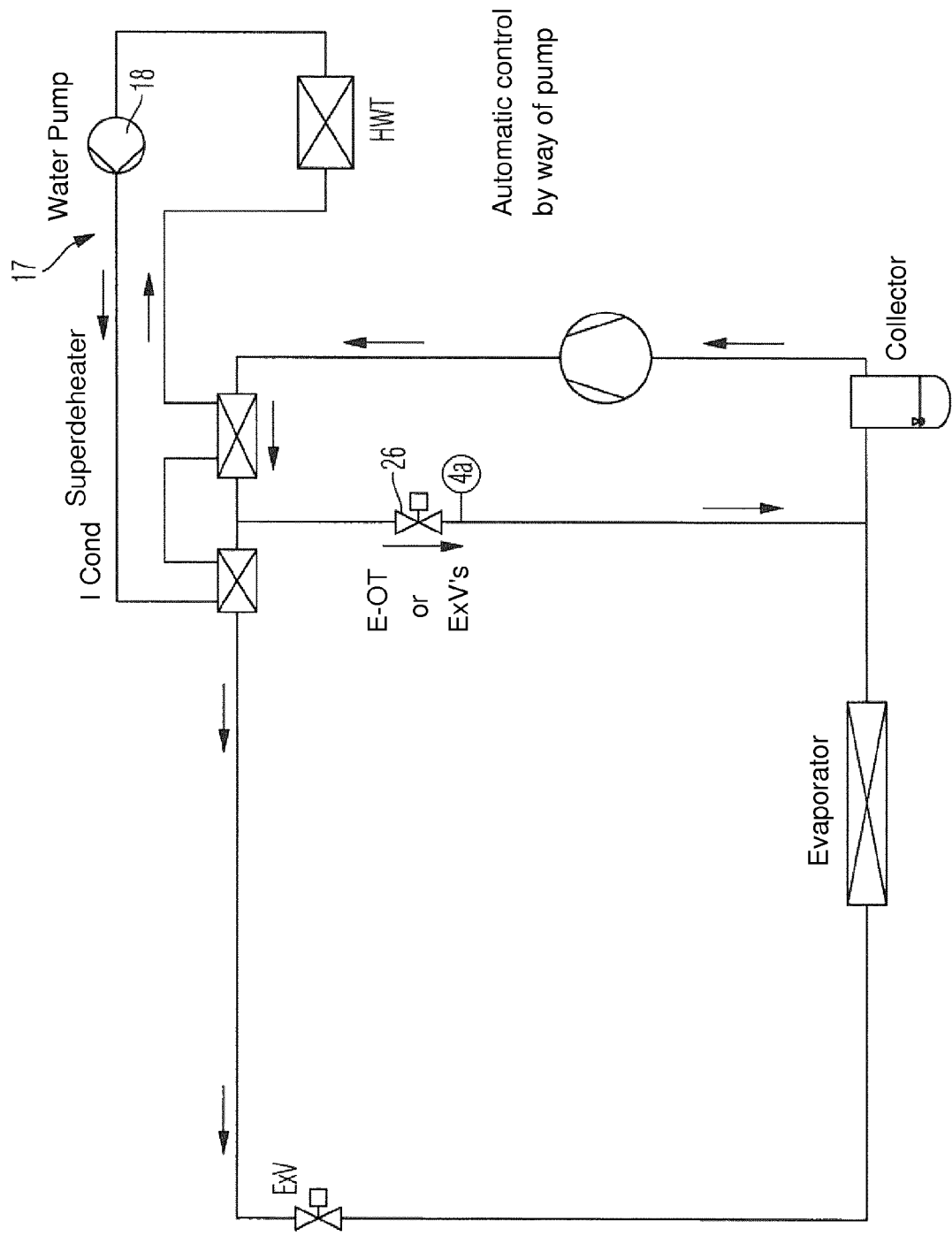
FIG. 5 is a schematic diagram of another embodiment of a refrigerant circuit according to the invention.

FIG. 5 shows an embodiment in which, in contrast to FIG. 1, the refrigerant path between the branch-off point 28 and the combination point 30 is omitted. Therefore, no third expansion element is provided but only the second expansion element 26. The condition 4a of the refrigerant following the second expansion element 26 can be automatically controlled here by controlling the fluid volume flow flowing through the heating circuit 17, i.e. by controlling the rotational speed of the water pump 18. By controlling the expansion element 26, the mass flow of the additional refrigerant for the refrigerant compressor and thereby the maximally possible rotational speed of the compressor are controlled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method of operating a refrigerant circuit as a heat pump, the method comprising the acts of:
  compressing a refrigerant, via a compressor, and pumping the compressed refrigerant through a refrigerant/heating heat exchanger;
  expanding refrigerant coming from an output of the refrigerant/heating heat exchanger in at least a first expansion element;
  flowing the expanded refrigerant from the first expansion element through at least one evaporator to an input of the compressor; and
  branching-off the refrigerant at a branch-off point of the refrigerant/heating heat exchanger located between an input of the refrigerant/heating heat exchanger and the output; and
  conducting the branched-off refrigerant, via a second expansion element, toward the suction input of the compressor.
2. The method according to claim 1, further comprising the act of:

cooling the refrigerant between the refrigerant input and the branch-off point.

3. The method according to claim 2, further comprising the act of:
cooling the refrigerant between the branch-off point and the refrigerant output in order to condense the refrigerant.

4. The method according to claim 3, wherein the refrigerant is supercritically cooled between the branch-off point and the refrigerant output.

5. The method according to claim 1, further comprising the acts of:
thermally coupling the refrigerant circuit via the refrigerant/heating heat exchanger with a heating circuit; and
flowing a fluid through the heating circuit, wherein the refrigerant/heating heat exchanger is a refrigerant/fluid heat exchanger.

6. The method according to claim 5, wherein the heating circuit has a fluid pump with an adjustable flow rate.

7. The method according to claim 1, wherein the refrigerant/heating heat exchanger is a refrigerant/air heat exchanger, the refrigerant/air heat exchanger emitting heat directly to an airflow to be heated.

8. The method according to claim 7, wherein a first section of the refrigerant/air heat exchanger is between the refrigerant input and the branch-off point and a second section is between the branch-off point and the refrigerant output, and
wherein the first and second sections are connected in series on an airflow side such that the air flows through the first section after flowing through the second section.

9. The method according to claim 1, further comprising the act of:
branching-off refrigerant coming from the refrigerant output of the refrigerant/heating heat exchanger and conducting the branched-off refrigerant, via a third expansion element, in a direction toward the suction input of the compressor.

10. The method according to claim 1, further comprising the act of:
conducting the refrigerant from the at least one evaporator, by way of a accumulator, to the suction input of the compressor.

11. The method according to claim 10, wherein the refrigerant conducted from the second expansion element flows to the suction input by way of the accumulator.

12. The method according to claim 11, wherein the refrigerant conducted from the third expansion element flows to the suction input by way of the accumulator.

13. The method according to claim 1, further comprising the act of:
automatically controlling a density of the refrigerant and/or a refrigerant mass flow at the suction input of the compressor by way of at least one of: the second expansion element, the third expansion element, or a rotational speed of the compressor.

14. The method according to claim 12, further comprising the acts of:
at or upstream of a refrigerant input of the accumulator, measuring, via a pressure sensor, a pressure of the refrigerant and/or measuring, via a temperature sensor, a temperature of the refrigerant, and determining a density of the refrigerant therefrom.

15. The method according to claim 14, the method further comprising the act of:
automatically controlling at least one of the second expansion element or the third expansion element as a function of at least one of the pressure or the temperature of the refrigerant.

16. The method according to claim 6, further comprising the act of:
automatically controlling a density of the refrigerant at an input of the second expansion element via a rotational speed of the fluid pump.

17. A refrigerant circuit operable as a heat pump, comprising:
a compressor for compressing a refrigerant in the circuit;
a refrigerant/fluid heat exchanger arranged in a flow direction of the refrigerant downstream of the compressor, the refrigerant/fluid heat exchanger having a refrigerant input in fluid communication with a delivery side of the compressor and having a refrigerant output;
a first expansion element arranged downstream of the refrigerant output;
an evaporator arranged downstream of the first expansion element, the refrigerant from the evaporator flowing to a suction input of the compressor;
a refrigerant branch-off point located between the refrigerant input and the refrigerant output, by way of which refrigerant is conducted to the suction input of the compressor while bypassing the evaporator, the first expansion element, and a section of the refrigerant/fluid heat exchanger downstream of the branch-off point.

18. The refrigerant circuit according to claim 17, further comprising:
a accumulator arranged between the evaporator and the suction input of the compressor or between the branch-off point and the suction input of the compressor.

19. The refrigerant circuit according to claim 18, further comprising a second expansion element arranged between the branch-off point and the accumulator.

20. The refrigerant circuit according to claim 19, further comprising a third expansion element arranged between the refrigerant output and the accumulator.

21. The refrigerant circuit according to claim 20, wherein at least one of the second or third expansion element is an automatically controllable expansion element.

22. The refrigerant circuit according to claim 20, wherein at least one of the second or the third expansion element is a throttle having a fixed cross-sectional flow.

23. The refrigerant circuit according to claim 17, further comprising:
a heating circuit comprising an adjustable flow rate pump, a fluid being arranged to flow through the heating circuit, wherein
the refrigerant circuit is thermally coupled with the heating circuit by way of the refrigerant/fluid heat exchanger.

* * * * *